United States Patent
Pelfrey

(10) Patent No.: US 7,431,504 B1
(45) Date of Patent: Oct. 7, 2008

(54) HIGH TEMPERATURE DAMPER FOR A ROLLER BEARING

(75) Inventor: Philip C Pelfrey, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 358 days.

(21) Appl. No.: 11/437,527

(22) Filed: May 18, 2006

(51) Int. Cl.
*F16C 27/00* (2006.01)
(52) U.S. Cl. .................. 384/99; 384/535; 384/581
(58) Field of Classification Search .............. 384/99, 384/535, 580
See application file for complete search history.

(56) References Cited

U.S. PATENT DOCUMENTS

| | | | |
|---|---|---|---|
| 4,669,893 A | 6/1987 | Chalaire et al. | |
| 4,867,655 A | 9/1989 | Barbic et al. | |
| 4,947,639 A | 8/1990 | Hibner et al. | |
| 5,044,789 A | 9/1991 | Damon et al. | |
| 5,052,828 A | 10/1991 | Ciokajlo et al. | |
| 5,056,935 A | 10/1991 | Singh | |
| 5,062,721 A | 11/1991 | Chiba | |
| 5,071,262 A | 12/1991 | Monzel et al. | |
| 5,085,521 A | 2/1992 | Singh | |
| 5,150,398 A * | 9/1992 | Nishioka et al. | 384/492 |
| 5,205,384 A | 4/1993 | Heshmat | |
| 5,380,100 A | 1/1995 | Yu | |
| 5,452,957 A | 9/1995 | Duggan | |
| 5,575,567 A * | 11/1996 | Brown | 384/132 |
| 5,624,191 A * | 4/1997 | Fuchs et al. | 384/100 |
| 6,007,252 A | 12/1999 | Thelen et al. | |
| 6,540,407 B2 | 4/2003 | Van Dine et al. | |
| 6,695,478 B2 | 2/2004 | Bos et al. | |

* cited by examiner

*Primary Examiner*—Thomas R Hannon
(74) *Attorney, Agent, or Firm*—John Ryznic

(57) ABSTRACT

A high temperature damper for a roller bearing having a long shelf life and capable of withstanding temperatures in a gas turbine engine shaft. The damper includes a damping chamber formed between a stator housing and the outer race of the bearing, and is filled with a liquid metal such as Gallium that has a paste-like consistency at room temperature so as not to flow and leak from the damping chamber, and a liquid-like consistency at about 1,500 degrees F. in order to withstand the extreme temperatures of a gas turbine engine. Seals having a U-shape cross section are made of a high temperature metal like Hastalloy or Hynes and enclose the liquid metal within the damping chamber.

13 Claims, 1 Drawing Sheet

US 7,431,504 B1

HIGH TEMPERATURE DAMPER FOR A ROLLER BEARING

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to rolling element bearings, and more specifically to a high temperature damper for the rolling element bearing.

2. Description of the Related Art including information disclosed under 37 CFR 1.97 and 1.98

There is a need in the prior art of bearings that are used in high temperature environments and that require long shelf lives for a bearing damper that will provide adequate damping for the bearing that will also withstand high temperatures and in which the damping material will not seriously degrade over long periods of time.

U.S. Pat. No. 5,452,957 issued to Duggan on Sep. 26, 1995 discloses a CENTER BEARING ASSEMBLY INCLUDING SUPPORT MEMBER CONTAINING RHEOLOGICAL FLUID for damping a radial ball bearing. The damping fluid is contained in an elastomeric chamber which would not be capable of use in a high temperature environment because the chamber would melt.

U.S. Pat. No. 4,867,655 issued to Barbic et al on Sep. 19, 1989 discloses a VARIABLE STIFFNESS OIL FILM DAMPER in which a bearing is supported by an oil squeeze film damper. An oil chamber is formed by elastomeric seals. The Barbic invention would not be capable of use in high temperature environments because the oil would vaporize. Also, the Barbic invention would not have a long shelf life because the oil could leak out from the damping chamber or the seals could oxidize due to age.

U.S. Pat. No. 5,026,721 issued to Chiba on Nov. 5, 1991 discloses a ROLLING BEARING WITH SLEEVE in which a synthetic resin spacer is used to provide bearing damping. The resin spacer is not capable of being used in high temperature environments because it would melt.

U.S. Pat. No. 6,007,252 issued to Thelen et al on Dec. 28, 1999 discloses a SUPPORT STRUCTURE WITH A VIBRATION DAMPER FOR ROTATABLY HOLDING A ROTATABLE BODY in which the vibration damper is an elastomeric element such as a metal rubber composite element. The metal is a solid and the rubber would not be capable of use in high temperature environments because rubber would melt.

U.S. Pat. No. 6,540,407 issued to Van Dine et al on Apr. 1, 2003 discloses a ROLLING ELEMENT BEARING ARRANGEMENT is which a vibration inhibiting outer ring member may contain a heavy metal such as tungsten. The heavy metal damper ring is a solid metal and not a liquid metal.

U.S. Pat. No. 5,044,789 issued to Damon et al on Sep. 3, 1991 discloses a ROLLER AND BALL BEARING ISOLATOR uses a steel radial wave spring to provide damping. The steel will withstand high temperature environments and have a long shelf life, but is not a liquid. It is also based on coulomb frication damping, which is not as desirable or advantageous as liquid viscous fluid-film damping.

U.S. Pat. No. 5,071,262 issued to Monzel et al on Dec. 10, 1991 discloses a SQUEEZE FILM DAMPER FLUID CONTROL device in which a damping space is filled with oil, and includes an oil inlet passage to provide a pressure to the oil in the space. The space in this invention is not a closed space because of the oil inlet passage, and therefore the damper can leak over time and, therefore, does not have a long shelf life. Also, the oil will evaporate, coke, and possibly ignite in a high temperature environment.

U.S. Pat. No. 5,052,828 issued to Ciokajlo et al on Oct. 1, 1991 entitled BEARING ASSEMBLY FOR USE IN HIGH TEMPERATURE OPERATING ENVIRONMENT and U.S. Pat. No. 5,205,384 issued to Heshmat on Apr. 27, 1993 entitled PODER-LUBRICATED DAMPER WITH WAVY DAMPER PADS both show bearing dampers for use in high temperature environments that also appear to have a long shelf life. However, they do not include a liquid metal as the damping material.

It is an object of the present invention to provide for a bearing damper that provides the desirable and advantageous fluid-film viscous damping and that can be used in an extremely high temperature environment.

It is another object of the present invention to provide for a bearing damper that will have a long shelf life.

BRIEF SUMMARY OF THE INVENTION

The present invention is a rolling element bearing damper which can be used under a high temperature environment and that has a long shelf life. The damper includes a closed chamber formed between a bearing support and an outer ring of the bearing (or bearing sleeve). The enclosed chamber is filled with gallium, a metallic material that has a consistency of a paste at room temperature, that of oil at around 300 degrees F., and that of water at 1,500 degrees F. because Gallium is a paste at room temperature, the bearing damper would have a long shelf life in that the gallium can be easily contained in the enclosed space and will not leak out. Also, gallium will not boil until about 3,000 degrees F., and therefore Gallium makes for an acceptable material for use in extremely high temperature environments such as in gas turbine engines.

DETAILED DESCRIPTION OF THE INVENTION

The present invention is a damper for a bearing, where the damper provides for damping in a radial direction. The bearing can be a roller bearing, a ball bearing, or any other bearing in which damping is required in a radial direction.

Figure 1:
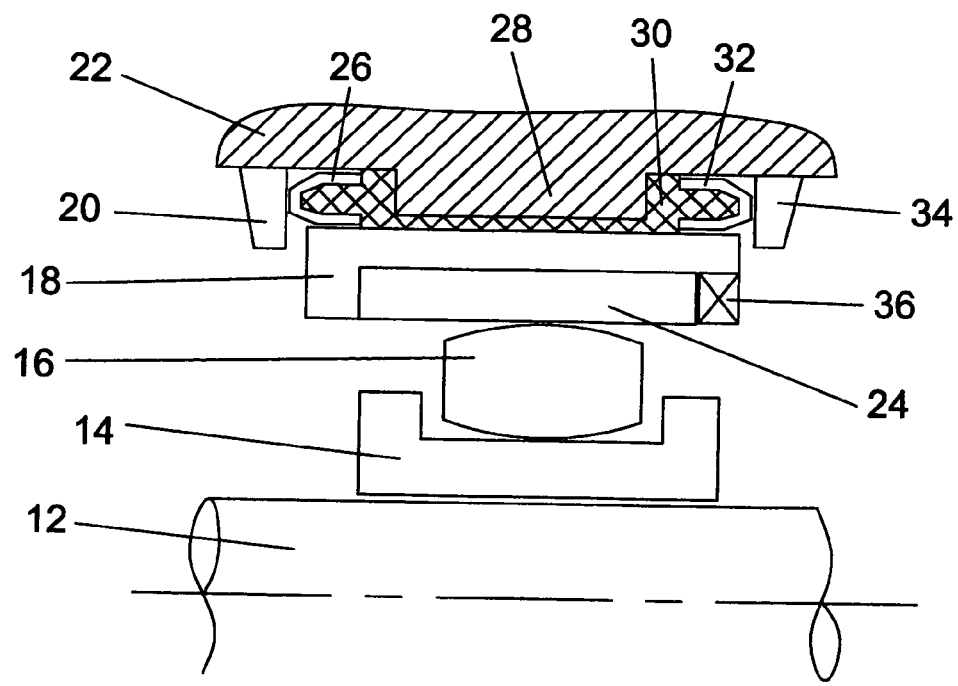
FIG. 1 is a cross section view of the liquid metal damper for a roller bearing of the present invention.

FIG. 1 shows the present invention in which a roller bearing is shown having an inner race 14 mounted over a shaft 12, an outer ring 24 placed in an outer ring sleeve 18, a roller member 16, a locking member 36 to secure the outer ring 24 within the outer ring sleeve 18, a stator housing 22 with a projection 28, a left side projecting member 20 and a right side projecting member 34. U-shaped lip seals 26 and 32 made of a high temperature resistant material such as Hastalloy or Haynes form a liquid damper chamber in which a liquid metal material such as Gallium 30 is contained. The projection member 28 extends toward the outer ring sleeve 18 to form a radial clearance of about 2 to 4 mils. At this close spacing, the damper of the present invention is considered to be a squeeze film damper. However, the present invention is not intended to be limited to squeeze film dampers. The Gallium is a liquid metal at room temperature with a consistency of a paste. As the temperature of Gallium increases towards its boiling point of about 3,000 degrees F., it becomes more liquid like. Therefore, Gallium makes a desirable material for use in extremely high temperature environments and provides for a long shelf life at room temperatures because it will not flow and therefore will not leak out over long periods of time.

Figure 2:
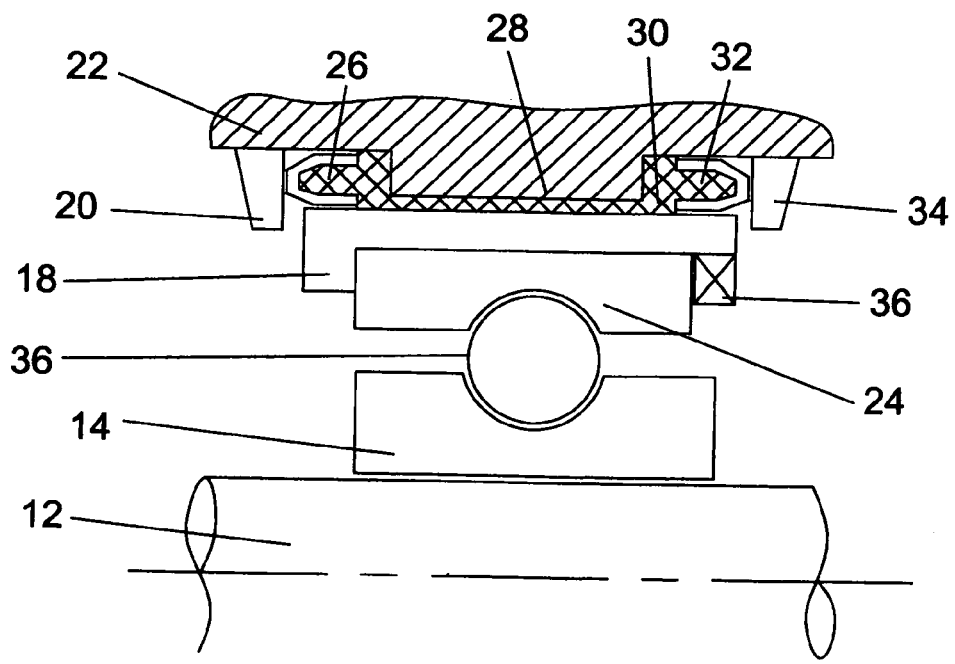
FIG. 2 is a cross section view of the liquid metal damper for a ball bearing of the present invention.

FIG. 2 shows the bearing damper of the present invention used in a ball bearing. The ball 36 in FIG. 2 is supported in an outer ring 24, the outer ring 24 being supported by the outer ring sleeve 18 as in FIG. 1. Common reference numbers used in both figures indicates that the member is the same in both figures.

I claim the following:

1. A damper for a roller bearing, the roller bearing having an inner race and an outer race, and a roller element between the two races, the inner race being mounted on a rotor shaft and the outer race being held in a stator housing, and a damping chamber formed between the housing and the inner race and having a damping fluid therein to dampen the bearing, the improvement comprising:

The damping fluid being a liquid metal that has a paste-like consistency at a room temperature and a liquid consistency at about 1500 degrees F.

2. The damper for a roller bearing of claim 1, and further comprising:

The damping fluid is made of at least 50% of Gallium.

3. The damper for a roller bearing of claim 1, and further comprising:

The damping chamber is formed by a U-shape metal seal that can withstand a temperature of 1,500 degrees F.

4. The damper for a roller bearing of claim 3, and further comprising:

The U-shape metal seal is made of Hastalloy X or Haynes.

5. The damper for a roller bearing of claim 1, and further comprising:

The damper is a squeeze film damper.

6. The damper for a roller bearing of claim 5, and further comprising:

A projection member extends from the stator housing toward the bearing outer race and forms a damper chamber spacing of about 2 to 4 mils thick.

7. The damper for a roller bearing of claim 1, and further comprising:

The roller bearing is a ball bearing.

8. The damper for a roller bearing of claim 1, and further comprising:

An outer ring sleeve forms a surface of the damper chamber and supports the outer race of the bearing.

9. A process for damping a roller bearing, the roller bearing having an outer race and an inner race with a roller member positioned between the two races, the process comprising the steps of:

Forming a damping chamber between the stator housing and the outer race of the bearing; and, Filling the damping chamber with a liquid metal that has a consistency of a paste at room temperature and a consistency of a liquid at about 1,500 degrees F.

10. The process for damping a roller bearing of claim 9, and further comprising the step of:

Forming the damping chamber with at least one U-shaped seal member made from a high temperature resistant material.

11. The process for damping a roller bearing of claim 9, and further comprising the step of:

Providing for the liquid metal to be at least 50% Gallium.

12. The process for damping a roller bearing of claim 9, and further comprising the step of:

Forming the damping chamber to be a squeeze film chamber of about 2 to 4 mils in thickness.

13. The process for damping a roller bearing of claim 9, and further comprising the step of:

Supporting the outer race of the bearing by an outer ring sleeve that forms part of the damping chamber wall.

* * * * *